United States Patent
van den Berg et al.

(10) Patent No.: US 10,348,753 B2
(45) Date of Patent: *Jul. 9, 2019

(54) DETECTING AND EVICTING MALICIOUS VEHICLES IN A VEHICLE COMMUNICATIONS NETWORK

(71) Applicant: Vencore Labs, Inc., Basking Ridge, NJ (US)

(72) Inventors: Eric van den Berg, Basking Ridge, NJ (US); Tao Zhang, Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/669,083

(22) Filed: Aug. 4, 2017

(65) Prior Publication Data

US 2017/0359365 A1    Dec. 14, 2017

Related U.S. Application Data (63) Continuation-in-part of application No. 14/575,793, filed on Dec. 18, 2014, now Pat. No. 9,729,566, (Continued)

(51) Int. Cl.
*G06F 11/00* (2006.01)
*H04L 29/06* (2006.01)
(Continued)

(52) U.S. Cl.
CPC .......... *H04L 63/1425* (2013.01); *H04L 9/006* (2013.01); *H04L 9/3268* (2013.01);
(Continued)

(58) Field of Classification Search
CPC ... H04L 63/1425; H04L 63/20; H04L 9/3268; H04L 9/006; H04L 2209/42;
(Continued)

(56) References Cited

U.S. PATENT DOCUMENTS 6,249,232 B1 *  6/2001  Tamura .................. G08G 1/163
                                                                180/167
8,973,129 B2 *  3/2015  van den Berg ......... H04L 63/20
                                                                726/22

(Continued)

FOREIGN PATENT DOCUMENTS

WO    WO2008115984    9/2008
WO    WO2011026092    3/2011

OTHER PUBLICATIONS

Braverman et al., "Mafia: A Theoretical Study of Players and Coalitions in a Partial Information Environment," The Annals of Applied Probabilty, 2008, pp. 1-23.

(Continued)

*Primary Examiner* — Samson B Lemma
(74) *Attorney, Agent, or Firm* — Heslin Rothenberg Farley & Mesiti P.C.

(57) ABSTRACT

A method, computer program product and computer system maintain a list that includes identifiers of vehicles determined by the processor of a detective vehicle to have an innocent status. The processor selects, for each sub-period of a predefined time period, a target vehicle from a plurality of vehicles, where the detective vehicle communicates either directly or indirectly with each vehicle of the plurality and accepts communications from the plurality, where a portion of the plurality of vehicles and the detective vehicle are within a vehicle-to-vehicle communication range, and where vehicle-to-vehicle communication does not utilize infrastructure network connectivity. The processor obtains, over a vehicle-to-vehicle communication or a network connection, messages regarding a status of the target vehicle. The processor determines the status of the target vehicle, where the status is one of: malicious or innocent. The processor (Continued)

notifies the vehicles associated with the identifiers on the list of the determination.

20 Claims, 5 Drawing Sheets

Related U.S. Application Data which is a continuation of application No. 12/872,569, filed on Aug. 31, 2010, now Pat. No. 8,973,129.

(60) Provisional application No. 61/238,681, filed on Aug. 31, 2009.

(51) Int. Cl.
<table>
<tr><td>*H04W 12/12*</td><td>(2009.01)</td></tr>
<tr><td>*H04L 9/32*</td><td>(2006.01)</td></tr>
<tr><td>*H04W 12/04*</td><td>(2009.01)</td></tr>
<tr><td>*H04W 4/20*</td><td>(2018.01)</td></tr>
<tr><td>*H04W 4/04*</td><td>(2009.01)</td></tr>
<tr><td>*H04L 29/08*</td><td>(2006.01)</td></tr>
<tr><td>*H04W 4/46*</td><td>(2018.01)</td></tr>
<tr><td>*H04L 9/00*</td><td>(2006.01)</td></tr>
</table>

(52) U.S. Cl.
CPC .............. *H04L 63/20* (2013.01); *H04L 67/12* (2013.01); *H04W 4/046* (2013.01); *H04W 4/20* (2013.01); *H04W 4/46* (2018.02); *H04W 12/04* (2013.01); *H04W 12/12* (2013.01); *H04L 2209/42* (2013.01); *H04L 2209/84* (2013.01)

(58) Field of Classification Search
CPC .. H04L 2209/84; H04W 12/04; H04W 12/12; H04W 4/20; H04W 4/046
USPC ...................................................... 726/22–26
See application file for complete search history.

(56) References Cited

U.S. PATENT DOCUMENTS

<table>
<tr><td>9,729,566 B2</td><td>8/2017</td><td>van den Berg et al.</td></tr>
<tr><td>2006/0225135 A1*</td><td>10/2006</td><td>Cheng ................. G06F 12/1063<br>726/26</td></tr>
<tr><td>2008/0103649 A1*</td><td>5/2008</td><td>Shen ...................... H04K 3/226<br>701/23</td></tr>
<tr><td>2008/0189788 A1*</td><td>8/2008</td><td>Bahl .................... G06F 21/577<br>726/25</td></tr>
<tr><td>2010/0201543 A1*</td><td>8/2010</td><td>Shorey .................. G08G 1/161<br>340/902</td></tr>
</table>

OTHER PUBLICATIONS

Moore et al. "Fast Exclusion of Errant Devices from Vehicular Networks," Sensor Mesh and Ad Hoc Communications and Network, 2008, pp. 1-9.

Sood et al., "Voter Models on Heterogeneous Networks," Phys. Rev. E, Apr. 22, 2006, pp. 1-14.

Maxim Raya et al., "Securing Vehicular Communications", IEEE Wireless Communications,Oct. 2006, pp. 8-15.

Supplementary European Search report, EP 10812746, dated Apr. 15, 2015.

International Search Report, International Application No. PCT/US2010/047293, dated Oct. 26, 2010.

Written Opinion, International Application No. PCT/US2010/047293, dated Oct. 20, 2010.

International Preliminary Report on Patentability, International Application No. PCT/US2010/047293, dated Aug. 10, 2011.

* cited by examiner

DETECTING AND EVICTING MALICIOUS VEHICLES IN A VEHICLE COMMUNICATIONS NETWORK

CROSS-REFERENCE TO RELATED APPLICATIONS

This application is a continuation-in-part of U.S. patent application Ser. No. 14/575,793, filed on Dec. 18, 2014, entitled "System and Method for Detecting and Evicting Malicious Vehicles in a Vehicle Communications Network," which is a continuation of U.S. patent application Ser. No. 12/872,569 filed on Aug. 31, 2010, entitled "System and Method for Detecting and Evicting Malicious Vehicles in a Vehicle Communications Network," which claims the benefit of U.S. Provisional Application No. 61/238,681, filed on Aug. 31, 2009, the entire disclosures of which are incorporated herein in their entirety.

FIELD OF THE INVENTION

The present invention relates to malicious behavior detection and malicious vehicle detection in a vehicle communications network.

BACKGROUND OF THE INVENTION

Agents interested in malicious behaviors include all entities that may engage in such behaviors and/or profit from it. These agents are grouped into three categories according to the amount of resources they may have to cause harm to the vehicular network:

The first category of attackers are solitary attackers who mainly operate on their own.

They have limited monetary resources and use the Internet as their main source of information. Examples of attackers in this category include: Unscrupulous or opportunistic individuals; Computer hackers; Automotive, electronic, or computer hobbyists; and Very loosely organized groups.

The second category of attackers are typically one or more groups of individuals who are moderately coordinated, communicate on a regular basis, have moderate resources, can obtain information not publicly known or available. Examples of attackers in this category include: Corrupt Insiders and Unscrupulous Businesses.

The third category of attackers are highly organized, have access to expansive resources, can infiltrate organizations and obtain closely held secrets, may consider life and individuals expendable to achieve their goals, and may be supported by governing bodies of foreign nations. Examples of attackers in this category include: Organized Crime and Foreign nations.

Some of the potential motivations that may drive agents to exhibit malicious behaviors within a vehicular network, in an order of increasing impact, are: Sadistic pleasure in harming other vehicles or the entire vehicular network; Preferential treatment from the vehicular network for the purposes of evading law enforcement, assisting in criminal operations, or diverting attention from a primary attack; Prestige in a successful hack or a new virus launch; Manipulate traffic authority decisions; Acquiring personal advantages in driving conditions or economic gain; e.g., committing insurance fraud or car theft; Promote national, political, and special interests; and Civil, political and economic disruption, including warfare.

Security attacks and malicious behaviors based on communications activities in a vehicle-to vehicle (V2V) communications environment can be categorized as follows:

1) Attackers could modify the communication content coming from their vehicles' software or hardware, including: inaccurate traffic conditions, including false warnings related to forward collisions, blind spot situations, lane changes, unsafe passing; and inaccurate driving conditions or patterns, such as false statements about speeds, braking, directions, positions, and intersection movement.

2) Attackers could modify the communication functionalities of their vehicles' software or hardware to carry out attacks, such as one of the attacks above and the following: modifying transmission timing intervals of messages; delaying the delivery of messages; sending more messages than the vehicle is designed to; not sending messages for a long enough time interval; and disabling the functioning of a vehicle's software, say, because of privacy concerns. Attackers could attempt to impersonate vehicles or other network entities (e.g., servers) to cause harm to the vehicular network operations. Attackers could act as intruders and attempt to use data stored on vehicles or other network entities (e.g., servers) to cause harm to the vehicular network operations.

In order to ensure safe and secure operation of a vehicle communications system, malicious use of the certificates to cause harm to the vehicles networks and applications need to be detected so that these certificates can be revoked. Malicious vehicles used to cause significant harm to the vehicle networks and applications need to be detected and "evicted" from the vehicle communications network. If vehicles have frequent infrastructure network connectivity, they can rely on trusted servers in the infrastructure network to detect and respond to security threats.

These infrastructure servers could collect information from a large number of vehicles and have sufficient processing capabilities to analyze the data to detect malicious activities. However, when vehicles have sporadic or zero infrastructure connectivity along the roads, attackers could perform attacks without being monitored by any highly trusted entities such as infrastructure servers. Vehicles can no longer rely on any infrastructure-based servers to help detect malicious activities. As a result, attacks will have much higher chances to be successful, and attackers would have a much higher chance of being undetected. Vehicles would have to rely on themselves and interactions with other potentially untrusted vehicles to detect malicious activities and mitigate their impacts.

In V2V communications, particularly with no infrastructure network support, it is essential for the vehicles to be able to rely on themselves and distributed techniques to detect malicious communications activities and to mitigate the impact of malicious vehicles by evicting (or eliminating) suspected malicious vehicle from the system (i.e., to ignore the messages sent from the suspected malicious vehicle). Such a capability allows the vehicles to communicate securely without being excessively impacted by malicious activities without relying on infrastructure network connectivity.

Several approaches exist in the prior art in which vehicles decide locally whether or not to evict a suspected malicious vehicle from the system. Two methods have recently been considered for V2V vehicular communications networks are: voting mechanisms, and 'Sacrifice' by individual vehicles, in which a suspected device is evicted together with its 'accuser'. (This is also sometimes termed "suicide for the common good").

In a voting mechanism, such as LEAVE described by T. Moore et al. "Fast exclusion of errant devices from vehicular networks", Proceedings IEEE SECON, San Francisco, Calif., Jun. 16-20, 2008, vehicles vote by exchanging signed claims of impropriety of another vehicle. Each vehicle then adds these warning messages to its 'accusation list'. Once the warning votes against a vehicle exceed a threshold, the accused vehicle is placed on a 'blacklist', similar to a local or temporary certificate revocation list (CRL). For nodes which are placed on the blacklist, additional 'disregard this vehicle' messages will be broadcast to other vehicles. Typically, the majority vote principle is used to decide when to deem another vehicle untrustworthy and to send a warning message about this untrusted vehicle.

A majority vote detection mechanism relies on an 'honest majority': every node must have more good neighbors than bad. Therefore, local communication graph structure can have a significant effect on the dynamics of the voter model, see, e.g., V. Sood, T. Antal, S. Redner, "Voter models on heterogeneous networks", Phys. Rev. E, April 2008. Bad nodes can eliminate good nodes if they form a local majority. Good nodes can eliminate bad nodes if they have a local majority. Specifically, they can send sufficiently many 'warning' and/or 'disregard' messages in LEAVE, for example.

For V2V communications, consider the following threat model: attackers can disseminate false messages and abuse the elimination mechanism. Furthermore, multiple attackers can collude.

In a sacrifice' based model, any vehicle can evict any other vehicle by simultaneously agreeing to limit its own participation in future V2V communications hence giving his decision more credibility. Therefore, in this scheme it is easier to evict a node than in a vote-based mechanism where a majority votes from multiple vehicles are used to decide whether to evict a vehicle. However, abuse of this mechanism is made more costly by forcing simultaneous removal of the accuser: 'Disregard' messages by an accuser cause simultaneous disregard of both the suspected node and its accuser.

The prior art fails to address how to determine how many malicious vehicles can the vehicle network tolerate before the innocent vehicles loss their ability to detect and evict malicious vehicles. The present invention has a provable bound on the number of malicious vehicles the system can tolerate before the system loses its ability to detect and evict malicious vehicles. This is important for determining how long the malicious detection and eviction method can continue to run before it has to rely on other means, such as communications with infrastructure-based intrusion detection systems, to eliminate the malicious vehicles.

SUMMARY OF THE INVENTION

Shortcomings of the prior art are also overcome and additional advantages are provided through the provision of a method for identifying malicious vehicles. The method includes: maintaining, by a processor of a detective vehicle, a list comprising identifiers of vehicles determined by the processor of the detective vehicle to have an innocent status; selecting, by the processor of a detective vehicle, for each sub-period of a predefined time period, a target vehicle from a plurality of vehicles, wherein the detective vehicle communicates either directly or indirectly with each vehicle of the plurality of vehicles and accepts communications from the plurality of vehicles, wherein a portion of the plurality of vehicles and the detective vehicle are within a vehicle-to-vehicle communication range, and wherein vehicle-to-vehicle communication does not utilize infrastructure network connectivity; based on the selecting, obtaining, over a vehicle-to-vehicle communication or a network connection, by the processor of the detective vehicle, messages regarding a status of the target vehicle; based on obtaining the messages, determining, by the processor of the detective vehicle, the status of the target vehicle, wherein the status is one of: malicious or innocent; and based on determining that the status of the target vehicle, notifying, by the processor of the detective vehicle, the vehicles associated with the identifiers on the list of the determination.

Systems and methods relating to one or more aspects of the technique are also described and may be claimed herein. Further, services relating to one or more aspects of the technique are also described and may be claimed herein.

Additional features are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawing.

DETAILED DESCRIPTION

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. The terms software and program code are used interchangeably throughout this application and can refer to logic executed by both hardware and software. Components of the system that can be utilized to execute aspects of embodiments of the present invention may include specialized hardware, including but not limited to, an FPGA and a GPU (graphics professor unit). Additionally, items denoted as processors may include hardware and/or software processors or other processing means, including but not limited to a software defined radio and/or custom hardware.

The present invention provides an approach that combines the vote and the sacrifice principles using a mathematical model called the "Mafia Game". The Mafia Game model focuses on the relative size of the group of attackers within a neighborhood necessary to dominate the entire network in the neighborhood (i.e., to eventually evict all the innocent vehicles). This combined approach does not lead to a false decision probability which the vote and the sacrifice mechanisms have to address. Furthermore, a low level of mobile or fixed infrastructure network connectivity could significantly increase the performance of the proposed approach.

In a vehicle communication network, some vehicles may be used by attackers to send false information to other vehicles which may jeopardize the safety of other vehicles. For example, a malicious vehicle may broadcast erroneous emergency break light messages to cause neighboring vehicles to think the malicious vehicle is breaking hard so the other vehicles will also have to reduce their speeds suddenly, which may cause accidents.

Vehicles should be able to detect malicious communications activities and to mitigate the impact of malicious vehicles by evicting (eliminating) suspected malicious vehicles from the system. Evicting a vehicle is to ignore the messages sent from the vehicle for a specified time period.

Such malicious behavior detection and mitigation methods can allow vehicles to communicate securely without being excessively impacted by malicious activities without relying on infrastructure network connectivity.

The present invention combines the voting and the sacrifice principles using a mathematical model based on the "Mafia Game". The Mafia Game model focuses on the relative size of the group of attackers within a neighborhood necessary to dominate the entire network in the neighborhood (i.e., to eventually evict all the innocent vehicles). This combined approach does not need to a false decision probability which the vote and the sacrifice mechanisms have to address. Furthermore, a low level of mobile or fixed infrastructure network connectivity could significantly increase the performance of the proposed approach.

The method for detecting and evicting malicious vehicles enables vehicles to have secure communications for significantly longer time, compared to prior art PKI solutions, before having to communicate with Certificate Authorities and therefore significantly reducing reliance on roadside infrastructure networks. This translates to a significantly small number of roadside network access points (base stations) that will be required to support the PKI operations for V2V communications, hence significantly reducing the costs of system deployment.

The proposed method has a provable bound on the number of malicious vehicles the system can tolerate before the system loses its ability to detect and evict malicious vehicles.

Connecting Mafia Game Theory to designing a practical PKI solution for V2V communications has not been described elsewhere.

Figure 1:
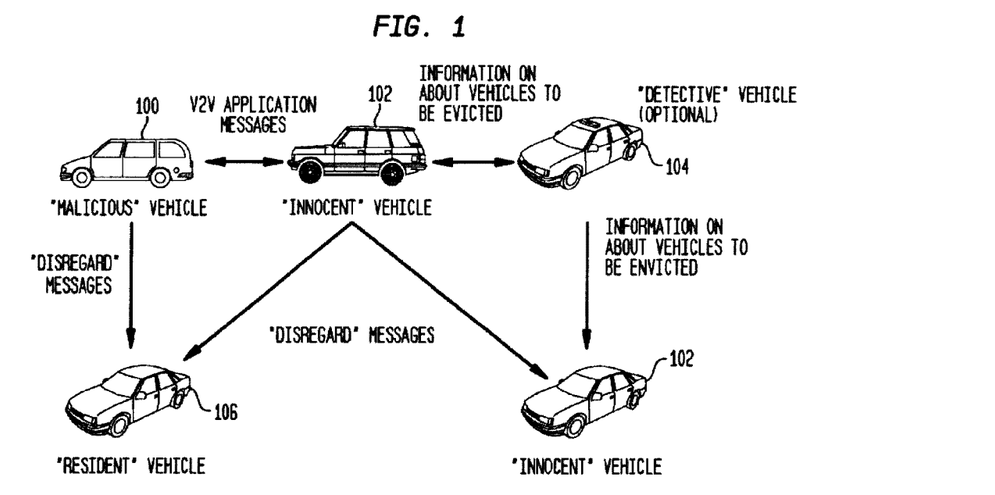
FIG. 1 shows a system architecture for the invention.

Referring to FIG. 1, although this figure shows the vehicles mentioned herein as cars, these vehicles are merely presented as an example of a possible vehicle into which aspects of the present invention may be implemented or may utilize various aspects of some embodiments of the present invention. Vehicles may include, but are not limited to, cars, planes, and/or drones. These vehicles may include drivers or may be driverless. As shown in the system architecture in FIG. 1, vehicles are classified into the following categories:

Malicious (Mafia) vehicles 100 are vehicles that have been detected to behave significantly differently from the behaviors designed by the vehicle manufacturers. Malicious vehicles are assumed to have full knowledge of who the other malicious vehicles in a neighborhood are. That is, collusion among malicious vehicles is possible. Through collusion, "Malicious" vehicles can create a local majority to eliminate a non-Malicious vehicle. "Malicious" vehicles can adapt their behaviors to that of Innocent vehicles so that they can postpone detection. In other words, they do not have to behave malicious all the time.

Innocent vehicles 102 are vehicles that behave as designed by the vehicle manufacturers.

Detective vehicles 104 are innocent vehicles that have the ability to detect whether another vehicle is innocent or malicious.

Vigilante vehicles are vehicles deemed/verified by the detective vehicles as innocent vehicles.

Resident vehicles 106 are vehicles of all categories combined in a given region or neighborhood.

Figure 2:
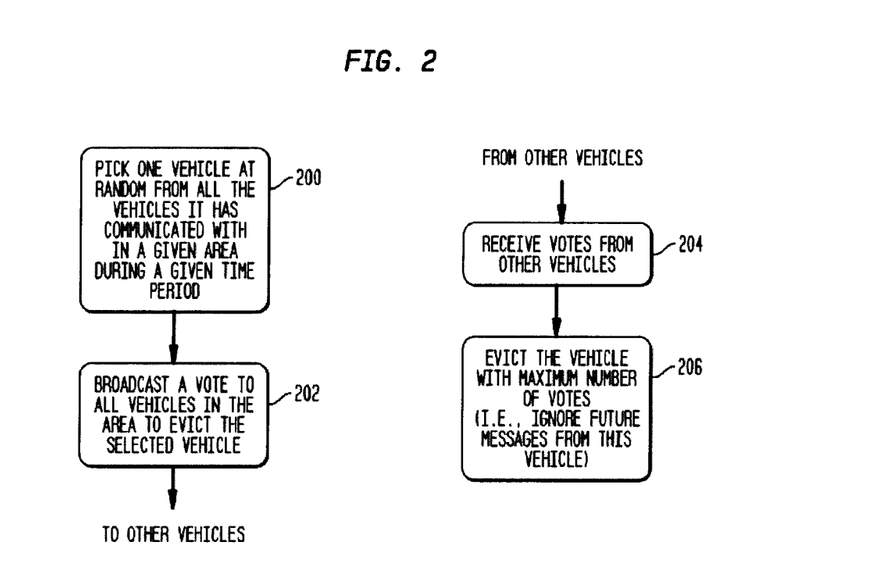
FIG. 2 is a flow chart of actions taken by innocent vehicles.

Applying the Mafia Game model to a V2V communications network, the vehicles can be viewed to be playing a game consisting of the following iterations or rounds:

1) Resident vehicles' Turn: Referring to FIG. 2, all Resident vehicles pick a vehicle to eliminate by majority vote 200. Each resident vehicle votes 202 to eliminate one vehicle. The votes from the Resident vehicles are received by the other vehicles 204. The vehicle receiving the most votes is then eliminated 206. In case of a tie, a vehicle is chosen uniformly at random from the vehicles receiving the maximum number of votes. The identity of the eliminated vehicle is revealed publicly via dissemination of a "Disregard" message.

2) Malicious vehicles' Turn: Malicious vehicles choose an innocent vehicle to eliminate. The only information announced publicly by the malicious vehicles will be the identity of the vehicle eliminated and whether it was a detective vehicle or not. Again, the result can be disseminated via a "Disregard" message.

3) Detective's Turn (if there are detective vehicles): Each detective vehicle acquires the Malicious or Innocent status of a vehicle. This status is then revealed only to the Detective vehicles. Detectives, for instance, can be police vehicles. Here, the Detective vehicle may collect messages from other vehicles and may communicate with infrastructure-based servers to help determine whether another vehicle is malicious or not.

After round t, there are $R_t = R - 2t$ Resident vehicles in the system. And the Mafia Game has two possible outcomes:

The "Innocent" vehicles win if all "Mafia" vehicles have been eliminated and there are still "Innocent" vehicles alive.

The "Mafia" vehicles win if all "Innocent" vehicles have been eliminated when there are still "Mafia" vehicles alive.

Next, here are analysis results on the performance of the scheme. For analysis purpose, the following assumptions are made:

a) In the game without "Detective" vehicles, assume that all "Resident" vehicles can send a message to all other Resident vehicles simultaneously. This is primarily to assure later votes are not influenced by earlier ones. Otherwise, Mafia vehicles may be able to influence the majority vote in the all-vehicle Residents round, to eliminate an Innocent vehicle with greater likelihood. This can be achieved using cryptographic protocols, for example.

b) In the game with Detectives, we assume that Residents can vote anonymously and the Residents can securely exchange messages, e.g. using a PKI system, with anonymized certificates.

The anonymous vote is used to coordinate votes of the Vigilante vehicles with the other (at least the Innocent) vehicles. Each Resident vehicle still announces its vote in a plurality vote. The anonymous vote is necessary to keep the identity of Vigilante vehicles unknown to non-Vigilante vehicles, in particular, unknown to Mafia vehicles. In this sense, the Vigilante vehicles are indeed an 'Anti-Mafia'. The cryptographic assumptions, in particular the anonymous pre-communication round, can be removed, if there are a simple majority of Vigilante vehicles among the Resident vehicles. This is easier to achieve when there are multiple, say d detectives: In particular, for any $\varepsilon>0$, there is a d such that d detectives have a probability of winning of at least $1-\varepsilon$ against a mafia of size $(\frac{1}{2}-\varepsilon)$ R.

Now it will be shown that voting will take a bounded number of sub-rounds that is polynomial in the number of "Resident" vehicles. This assumption can be satisfied even if the vehicles' votes need to be propagated over several hops, i.e., when not all vehicles are within one-hop broadcast range with each other. Furthermore, the number of computational steps each vehicle can take between rounds is also bounded by a polynomial in the number of residents.

The optimal strategies in the game without detectives are given as follows:

Innocent Vehicle's Optimal Strategy: In iteration t, each "Resident" vehicle $1 \leq s \leq R_t$ picks a random vehicle to eliminate. As long as the "Innocent" vehicles have the majority in each Residents round, a random resident vehicle will be eliminated.

Malicious Vehicle's Optimal Strategy: As long as the "Innocent" vehicles have the majority, the "Mafia" vehicles may as well follow the same strategy of choosing a random innocent in each Residents round.

The following results about a network with R Resident vehicles can be derived based on analysis related to the Mafia Games:

In the game without Detectives: Malicious vehicles will surely lose if the number of them is lower than the order of $\sqrt{R}$, have a comparable chance of winning if the number of them is in the order of $\sqrt{R}$, and win if the number of them is larger than order $\sqrt{R}$.

In the game with $d \geq 1$ Detectives, The probability of the Malicious vehicles winning is only comparable to the Innocent's winning when there are at least $\eta R$. Malicious vehicles, for some constant $\eta$ that satisfies $0 < \eta \leq 1$.

The above results provide several significant insights that provide a solid foundation for designing a V2V security system without roadside infrastructure networks. These insights include, for example, if it is possible to design a malicious vehicle detection and eviction approach so the number of malicious vehicles is kept below their critical mass (for example in the order of $\sqrt{R}$ or $\eta R$ with zero or one Detective vehicle), the system will be able to quickly evict the malicious vehicles and maintain safe and secure communications continuously. Also, the addition of a single infrastructure node can significantly decrease the power of Malicious vehicles.

Establishing a 'white list' of vigilante vehicles, which are known innocent vehicles rather than distributing more "Disregard" messages or CRLs can be a more effective approach to increase the chance of winning for the Innocents.

In some embodiments of the present invention, various vehicles within a V2V network may distribute the white list (i.e., a core of trusted vehicles), to other vehicles that the come into contact with during shifts in vehicles in a given V2V network. For example, a vehicles may distribute the white list to a group on initially untrusted vehicles. This list can be communicated over multiple hops and not just directly utilizing the V2V connection.

Furthermore, the suicide of the Detective is particularly powerful, as opposed to the solitary act considered in other mechanisms. This solitary sacrifice is one interpretation of the elimination process after majority vote, which bypasses the need to model false decision probabilities.

Figure 3:
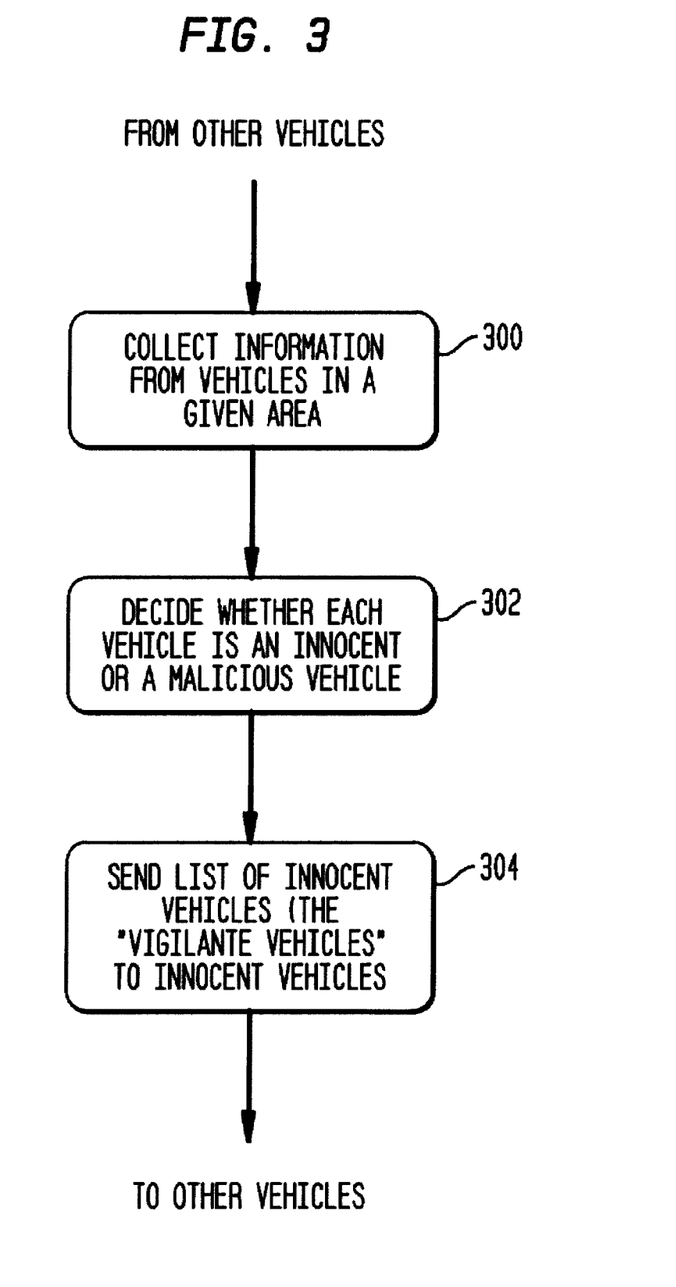
FIG. 3 is a flow chart of actions by detective vehicles.

With one Detective vehicle, the optimal game for the Innocent vehicles will be the following:

Suppose there is a single Detective vehicle. Referring to FIG. 3, during the first $\sqrt{\eta R}$ rounds, the detective collects information about vehicles at random 300. The other Innocents vote in each round to eliminate a vehicle at random. After $\sqrt{\eta R}$ rounds, the Detective compiles a $\sqrt{\eta R}$ list V of so-called "Vigilante" vehicles that are vehicles known to be Innocents 302. At this stage, the number of Vigilantes $|V|$ should be larger than the number of Malicious (Mafia) vehicles $|M|$ (since $\sqrt{\eta} > \eta$ for $0 < \eta < 1$). The group of Vigilantes acts as an "anti-Mafia". The Detective encrypts the list of Vigilantes, and sends the encrypted list to each member of V so that the Vigilantes know which vehicles are also Vigilantes 304. The Detective then asks everyone to eliminate him. Upon being eliminated, the identity of the Detective is revealed, and therefore each Vigilante knows that the messages and encrypted list they have received is genuine.

Once the detective is evicted, in each round, the highest ranking (numbered) member of V selects a member outside of V to be eliminated, and communicates to the other members of V the identity of the vehicle to be eliminated, say p. All Innocent vehicles abstain from voting in a secure anonymous vote to coordinate/select the next vehicle p to eliminate. After this pre-communication round, every non-Mafia vehicle sends a 'Disregard-p' message.

This shows that a single Detective vehicle can significantly increase the number of Malicious vehicles needed to dominate the game to $\eta R$, $0 < \eta < 1$ from $\sqrt{R}$.

Therefore, an enhanced malicious vehicle detection and eviction method is as followings:

[1] Consider an arbitrary geographical region.

[2] Time is divided into time periods of equal or variable lengths.

[3] For each time period: 10 a. The Resident vehicles in the region pick one vehicle to eliminate by majority vote. Each Resident vehicle picks one vehicle it wants to eliminate and sends out its vote in a message to other vehicles. The vehicle receiving the most votes is eliminated. In case of a tie, a vehicle is chosen uniformly at random from the vehicles receiving the maximum number of votes. The identity of the eliminated vehicle is revealed publicly via dissemination of a "Disregard" message. If the eliminated vehicle is a Detective vehicle, this fact is revealed as well.

b. For each time period T: Each Detective vehicle acquires the "Malicious" or "Innocent" status of a single randomly selected vehicle. This status is then revealed only to the Detective vehicles. Here, the Detective vehicle may collect messages from other vehicles and may communicate with infrastructure-based servers to help determine whether another vehicle is malicious or not.

[4] During the first $\sqrt{\eta R}$ time periods (rounds), the Detective vehicle compiles and maintains an up to date "white list" V of "Vigilante" vehicles. At this stage, the number of Vigilantes $|V|$ should be larger than the number of Malicious vehicles $|M|$ (since $\sqrt{\eta} > \eta$ for $0 < \eta < 1$). The Detective vehicle encrypts the white list of Vigilantes and sends the encrypted list to each member of V so that the Vigilante vehicles know which other vehicles are also vigilantes. The Detective vehicle then asks other vehicles to eliminate itself by sending out a "Disregard" message revealing its own identity. Upon being eliminated, the identity of the detective is revealed, and therefore each Vigilante vehicles know that the messages and encrypted list white list" they have received is genuine.

[5] Once the Detective vehicle is evicted, the white list of Vigilante vehicles is known to be genuine, and can be acted upon. In each time period (round), the highest ranking (numbered) member of V selects a member outside of V to be eliminated by sending a "Disregard" message to all vehicles in V. All innocent vehicles abstain from voting in a secure anonymous vote to coordinate on the next vehicle p to eliminate. All Vigilante vehicles vote for p. After this round, all vehicles vote for p in the majority vote, and 'Disregard-p' messages are sent. This shows that a single Detective vehicle to significantly increase the number of malicious vehicles needed to dominate the game to $\eta R$, $0<\eta<1$ from $\sqrt{R}$.

In an embodiment of the present invention where detective vehicles are present, the communication capabilities of the vehicles are not limited to communicating directly with vehicles within a V2V network. Rather, the detective vehicles can communicate with each other, other vehicles, and other computing devices, even if the communications involve multiple hops. Thus, in embodiments of the present invention, vehicles may communicate over established networks as well as self-forming mesh networks, wired and/or wireless, including but not limited to, field area networks.

Various aspects of the present disclosure may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc. A module may be a component of a device, software, program, or system that implements some "functionality", which can be embodied as software, hardware, firmware, electronic circuitry, or etc.

Embodiments of the present invention include a method for vehicles to detect and evict malicious vehicles in a vehicle-to-vehicle communications network using the Mafia Game theory that includes malicious mafia vehicles that have been detected to behave significantly differently from the behaviors designed by the vehicle manufacturers, innocent vehicles that behave as designed by the vehicle manufacturers, vigilante vehicles that are deemed or verified by a detective vehicle as an innocent vehicle which is a vigilante vehicle, and detective vehicles that are innocent vehicles that have the ability to detect whether another vehicle is an innocent vehicle or a malicious vehicle, or a vigilant vehicle, where resident vehicles are vehicles of all categories in a region.

In some embodiments of the present invention, the time is divided into periods and during each time period the innocent vehicles will pick a vehicle to eliminate by majority vote and each innocent vehicle votes to eliminate one vehicle in each time period.

In some embodiments of the present invention, each innocent vehicle receives votes from other vehicles in each time period and eliminates the vehicle that has received the most votes. In case of a tie, a vehicle is chosen uniformly at random from the vehicles receiving the maximum number of votes.

In some embodiments of the present invention, a vehicle reveals the identity of the eliminated vehicle by sending a "DISREGARD" message to all other vehicles in the region.

In some embodiments of the present invention, malicious vehicles can also behave as the innocent vehicles and choose an innocent vehicle to eliminate in each time period.

In some embodiments of the present invention, a malicious vehicle reveals the identity of the vehicle eliminated and whether the eliminated vehicle was a detective vehicle or not by sending a "DISREGARD" message to other vehicles.

In some embodiments of the present invention, each detective vehicle acquires the malicious or innocent status of a vehicle and then reveals the status to only other detective vehicles by sending a secure message to the other detective vehicles.

In some embodiments of the present invention, the first $\sqrt{\eta R}$ time periods where R is the total number of vehicles in the region and is a constant value between zero and one, a detective vehicle compiles and maintains an up to date "white list" of vigilante vehicles, encrypts the up-to date white list or changes to the white list, and sends the encrypted list to each vigilante vehicle on the white list.

In some embodiments of the present invention, the detective vehicle requests other vehicles to eliminate itself and reveals its identity by sending a "DISREGARD" message to the other vehicles.

In some embodiments of the present invention, in each time period, the highest ranking numbered member of V selects a member outside of V to be eliminated, and communicates to the other members of V the identity of the vehicle to be eliminated, say p where all innocent vehicles abstain from voting in a secure anonymous vote to coordinate/select the next vehicle p to eliminate after this pre-communication round, every (non-Mafia) vehicle sends a 'Disregard-p' message.

Embodiments of the present invention include a computer-implemented method, a computer program product, and a computer system for detecting a malicious vehicle. Embodiments of the present invention includes one or more programs executed by one or more processors that select, for each sub-period of a predefined time period, a target vehicle from a plurality of vehicles, where the processor is a processor of a detective vehicle, where the plurality of vehicles and the detective vehicle are within a vehicle-to-vehicle communication range, and where vehicle-to-vehicle communication does not utilize infrastructure network connectivity. Based on the selecting, the one or more programs obtain messages regarding a status of the target vehicle from at least one of: a group of vehicles from the plurality of vehicles, or an infrastructure-based server accessible to the target vehicle via a network connection, where the detective vehicle and each vehicle of the plurality of vehicles has a sporadic connection or no connection to the infrastructure-based server. Based on obtaining the messages, one or more programs determine the status of the target vehicle, where the status is one of: malicious or innocent, where a vehicle with a malicious status sends erroneous messages the plurality of vehicles, and where a vehicle with an innocent status sends correct messages to the plurality of vehicles based on determining that the status of the target vehicle is innocent, retaining an identifier of the target vehicle on a list comprising identifiers of vehicles determined by the processor to have the innocent status; and based on the predefined time period elapsing, the one or more programs provide the list to the vehicles associated with the identifiers on the list.

In some embodiments of the present invention, the one or more programs obtain, utilizing a processor of a first vehicle of the plurality of vehicles, a message from a second vehicle of the plurality of vehicles, where an identifier associated with the first vehicle is on the list, and where an identifier associated with the second vehicle is not on the list. The one or more programs obtain, using the processor of the first vehicle, the list. Based on the obtaining of the list and the obtaining of the message, the one or more programs select, utilizing the processor of the first vehicle, during a sub-period of a second predefined time period, the second vehicle. After obtaining the list, the one or more programs reject, utilizing the processor of the first vehicle, further communications sent by the detective vehicle.

In some embodiments of the present invention, the one or more programs provide a communication to the vehicles associated with the identifiers on the list, wherein the communication comprises identifying the detective vehicle as a detective vehicle.

In some embodiments of the present invention, the predefined time period comprises $\sqrt{\eta R}$ sub-periods, where R comprises a total number of vehicles of the plurality of vehicles in and $\eta$ comprises a constant value between 0 and 1, and where, for each sub-period, the list is updated by the detective vehicle.

In some embodiments of the present invention, the one or more programs, prior to the providing, encrypt, by the processor, the list, where the vehicles associated with the identifiers on the list can decrypt the list with certificates. The one or more programs provide a request to the vehicles associated with the identifiers on the list to reject future communications from the detective vehicle for a specified time period.

In some embodiments of the present invention, based on the selecting, the one or more programs obtain, utilizing the processor of the first vehicle, messages regarding a status of the second vehicle from the vehicles associated with the identifiers on the list. Based on obtaining the messages, the one or more programs determine that the status of the second vehicle is malicious and rejecting future vehicle-to-vehicle communications from the second vehicle for a specified time period. The one or more programs notify, utilizing the processor of the first vehicle, the vehicles associated with the identifiers on the list, that the status of the second vehicle is malicious.

In some embodiments of the present invention, the providing includes providing the list to a first vehicle of the plurality of vehicles, where an identifier associated with the first vehicle is on the list, the method further includes: the one or more programs sending a vehicle-to-vehicle communication to the first vehicle after the providing and subsequent to the sending, obtaining a rejection from the first vehicle of the vehicle-to-vehicle communication from the detective vehicle.

In some embodiments of the present invention, the one or more programs, subsequent to a specified time period, send a second vehicle-to-vehicle communication to the first vehicle and subsequent to the sending, the one or more programs obtain an acceptance from the first vehicle of a the second vehicle-to-vehicle communications from the detective vehicle.

In some embodiments of the present invention, at least one of the detective vehicle, the first vehicle, or the second vehicle is an unmanned aerial vehicle.

Some embodiments of the present invention include various systems and methods of notifying vehicles of the statuses or presumed statuses of various vehicles. The vehicles communicating with each other, either via V2V communication channel or via one or more hops on a self-forming communications network, such as a mesh network or a FAN, change based on temporal shifts. Because various vehicles come into contact with other vehicles often, a first vehicle may benefit from information from a second vehicle, about a third vehicle, because the second vehicle, which has not been in contact with the first vehicle, may come into contact with the third vehicle, at some point in the future. For example, if the first vehicle is aware, based on various aspects of the present invention, that the third vehicle is malicious, the first vehicle may convey that information to the second vehicle. Although the second vehicle is not in contact with the first vehicle upon receipt of this notification, should the third vehicle attempt contact with the second vehicle, based on the notification from the first vehicle, the third vehicle may refuse this contact. The second vehicle may also, in turn, warn additional vehicles about the malicious status of the third vehicle. In this manner, vehicles that communicate with each other may form a swarm, and provide decentralized intelligence to each other and to other vehicles.

In embodiments of the present invention, one or more vehicles may utilize a dynamic white list as a notification list. When new discoveries are made regarding various vehicles, a member of the white list may seek to distribute this additional information to other vehicles on the white list. A challenge of distributing this information is that at the time that the new information is available, the vehicle distributing the information may no longer be in V2V contact with at least one client on the white list. Thus, one or more programs executing on at least one processor in the vehicle may not only communicate alerts to vehicles communicating with that initial vehicle over a V2V connection, the one or more programs may also utilize networks between various vehicles, including self-forming mesh networks, to convey information to vehicles on the notification list (the white list) that are more than one hop away. One or more programs executing on a device in a given vehicle may address a message to a given vehicle and the message can be forwarded through multiple nodes until the message reaches the destination.

In order to secure a message traveling to a destination over multiple hops, in an embodiment of the present invention, each member of a white list may utilize a method of encryption and/or decryption so that updates, if intercepted during hops, cannot be understood by computing systems that are not on the white list. For example, when in V2V communication, a vehicle may distribute an encryption key to members of the white list. When the one or more programs in a given vehicle send an update, for example, updating the clients on the white list, the one or more programs may first encrypt the transmission, such that only vehicles with keys can decrypt the transmission. Each vehicle with a key can both encrypt transmissions before sending them to other vehicles and decrypt transmissions received from other vehicles.

Figure 4:
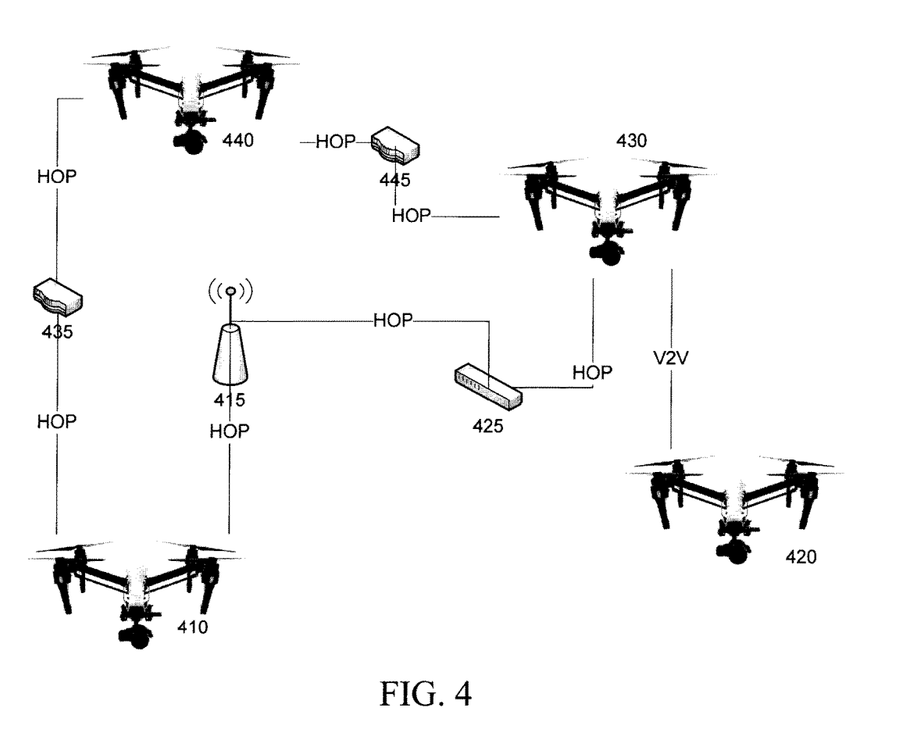
FIG. 4 is a technical environment into which aspects of embodiments of the present invention may be implemented.

FIG. 4 is an example of how a vehicle in a given network can utilize one or more hops in order to communicate a notification to another vehicle. In this example, the vehicles depicted are drones, but as explained earlier, this is merely one example of vehicles that can be utilized in embodiments of the present invention. As illustrated in FIG. 4, the "hops" to communicate between vehicles may represent other vehicles or other network entities, such as routers, switches, and Internet of Things (IoT) devices that can be utilized to route a notification. By way of example, FIG. 4 depicts four vehicles, 410 420 430 440, and one vehicle 420 is sending an alert to a distribution list that includes the remaining vehicles 410 430 440. The messaging vehicle 420 can communicate with a first vehicle on the distribution list 430, via V2V communications. However, in order to convey the message to the second 440 and third 410 recipients on the distribution list (e.g., the white list), the message travels over hops in a self-forming mesh network. In this example, the first vehicle on the distribution list 430 relays the message from the messaging vehicle 420 to the second 440 and third 410 recipients, through various computing devices, including a wireless access point 415, a switch 425, and two routers 435 445.

Figure 5:
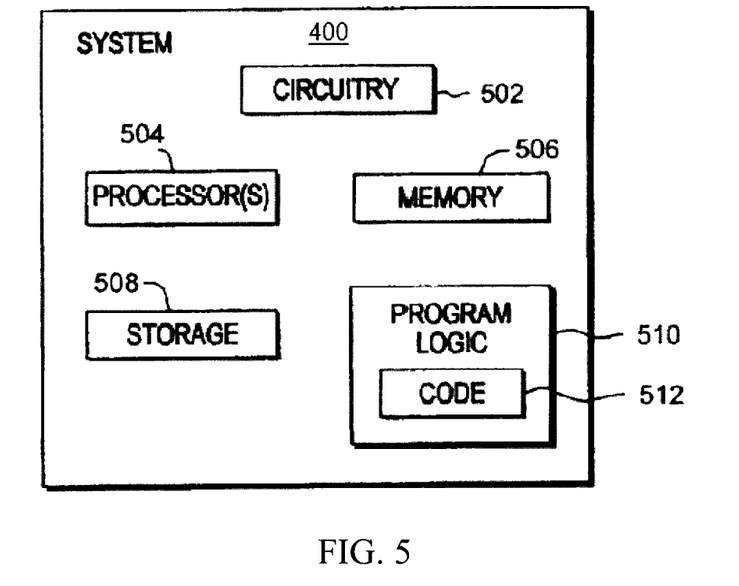
FIG. 5 depicts a computer system configured to perform an aspect of an embodiment of the present invention.

FIG. 5 illustrates a block diagram of a resource 400 in computer system, such as, which is part of the technical architecture of certain embodiments of the technique. Returning to FIG. 5, the resource 400 may include a circuitry 502 that may in certain embodiments include a microprocessor 504. The computer system 400 may also include a memory 506 (e.g., a volatile memory device), and storage 508. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 400 may include a program logic 510 including code 512 that may be loaded into the memory 506 and executed by the microprocessor 504 or circuitry 502.

In certain embodiments, the program logic 510 including code 512 may be stored in the storage 508, or memory 506. In certain other embodiments, the program logic 510 may be implemented in the circuitry 502. Therefore, while FIG. 5 shows the program logic 510 separately from the other elements, the program logic 510 may be implemented in the memory 506 and/or the circuitry 502. The program logic 510 may include the program code discussed in this disclosure that facilitates the reconfiguration of elements of various computer networks, including those in various figures.

Figure 6:
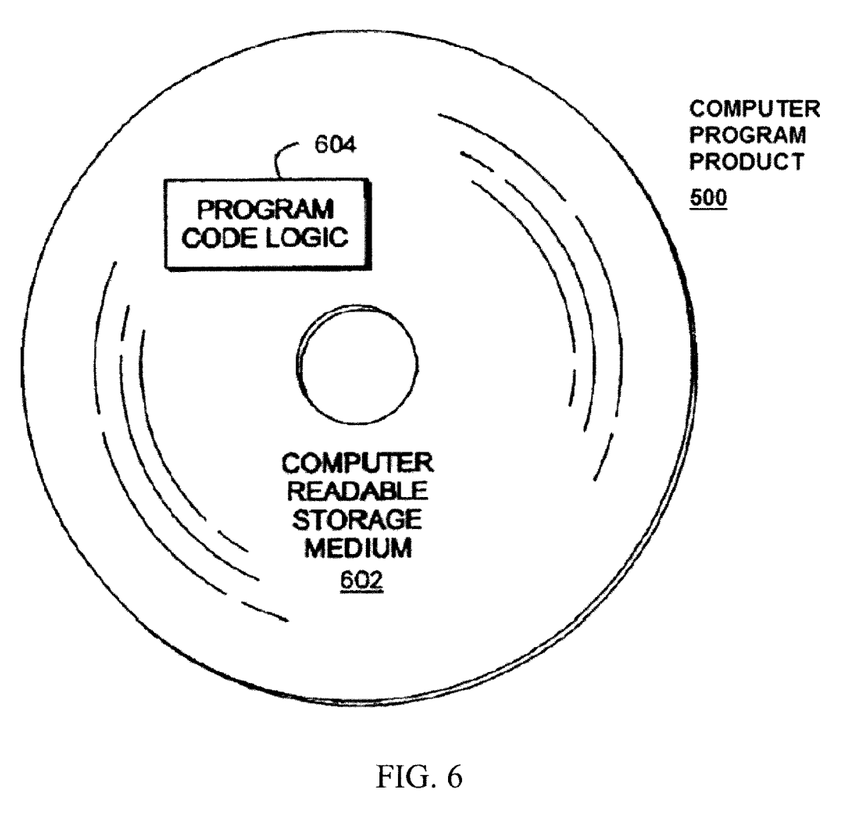
FIG. 6 depicts a computer program product incorporating one or more aspects of the present invention.

Using the processing resources of a resource 400 to execute software, computer-readable code or instructions, does not limit where this code can be stored. Referring to FIG. 6, in one example, a computer program product 500 includes, for instance, one or more non-transitory computer readable storage media 602 to store computer readable program code means or logic 604 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, C++ or the like, and conventional procedural programming languages, such as the "C" programming language, PHP, ASP, assembler or similar programming languages, as well as functional programming languages and languages for technical computing (e.g., Matlab). The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Furthermore, more than one computer can be used for implementing the program code, including, but not limited to, one or more resources in a cloud computing environment.

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions, also referred to as software and/or program code, may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples. Additionally or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique.

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server, and/or embedded system.

While there has been described and illustrated a system and method for detecting and evicting malicious vehicles in a vehicle communication network, it will be apparent to those skilled in the art that modifications and variations are possible without deviating from the principles and broad teachings of the present invention which shall be limited solely by the scope of the claims appended hereto.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or steps plus function elements in the descriptions below, if any, are intended to include any structure, material, or act for performing the function in combination with other elements as specifically noted. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular uses contemplated.

The invention claimed is:

1. A computer-implemented method comprising:
   maintaining, by a processor of a detective vehicle, a list comprising identifiers of vehicles determined by the processor of the detective vehicle to have an innocent status;
   selecting, by the processor of a detective vehicle, for each sub-period of a predefined time period, a target vehicle from a plurality of vehicles,
      wherein the detective vehicle communicates either directly or indirectly with each vehicle of the plurality of vehicles and accepts communications from the plurality of vehicles,
      wherein a portion of the plurality of vehicles and the detective vehicle are within a vehicle-to-vehicle communication range, and
      wherein vehicle-to-vehicle communication does not utilize infrastructure network connectivity;
   based on the selecting, obtaining, over a vehicle-to-vehicle communication or a network connection, by the processor of the detective vehicle, messages regarding a status of the target vehicle;
   based on obtaining the messages, determining, by the processor of the detective vehicle, the status of the target vehicle, wherein the status is one of: malicious or innocent; and
   based on determining that the status of the target vehicle, notifying, by the processor of the detective vehicle, the vehicles associated with the identifiers on the list of the determination.

2. The computer-implemented method of claim 1, wherein a vehicle with a malicious status sends erroneous messages the plurality of vehicles, and wherein a vehicle with an innocent status sends correct messages to the plurality of vehicles.

3. The computer-implemented method of claim 1, further comprising:
   based on determining that the status of the target vehicle is innocent, retaining an identifier of the target vehicle on the list; and
   transmitting, by the processor of the detective vehicle, the list to the target vehicle.

4. The computer-implemented method of claim 1, wherein the obtaining the messages comprises obtaining message from at least one of: a group of vehicles from the plurality of vehicles, or an infrastructure-based server accessible to the target vehicle via a network connection, wherein the detective vehicle and each vehicle of the plurality of vehicles has a sporadic connection or no connection to the infrastructure-based server.

5. The computer-implemented method of claim 1, wherein the portion of the plurality of vehicles and the detective vehicle are within the vehicle-to-vehicle communication range comprise the vehicles associated with the identifiers on the list.

6. The computer-implemented method of claim 1, the vehicles associated with the identifiers on the list comprise vehicles in direct communication with the detective vehicle within the vehicle-to-vehicle communication range and in indirect communication with the detective vehicle over at least one hop on a network.

7. The computer-implemented method of claim 6, wherein the network is a self-forming mesh network.

8. The computer-implemented method of claim 3, wherein the target vehicle is outside of the vehicle-to-vehicle communication range and accessible to the detective vehicle over at least one hop.

9. The computer-implemented method of claim 3, wherein the target vehicle is within the vehicle-to-vehicle communication range.

10. The computer-implemented method of claim 1, further comprising:
    based on determining that the status of the target vehicle is malicious, evicting the target vehicle from the plurality of vehicles.

11. The computer-implemented method of claim 10, wherein the evicting comprises:
    rejecting direct and indirect communications from the target vehicle: and severing ad-hoc network connections between the target vehicle and the detective vehicle.

12. A computer program product for detecting a malicious vehicle, the computer program product comprising:

a non-transitory computer readable storage medium readable by a processor and storing instructions for execution by the at least one processor for performing a method comprising:
    maintaining, by a processor of a detective vehicle, a list comprising identifiers of vehicles determined by the processor of the detective vehicle to have an innocent status;
    selecting, by the processor of a detective vehicle, for each sub-period of a predefined time period, a target vehicle from a plurality of vehicles,
        wherein the detective vehicle communicates either directly or indirectly with each vehicle of the plurality of vehicles and accepts communications from the plurality of vehicles,
        wherein a portion of the plurality of vehicles and the detective vehicle are within a vehicle-to-vehicle communication range, and
        wherein vehicle-to-vehicle communication does not utilize infrastructure network connectivity;
    based on the selecting, obtaining, over a vehicle-to-vehicle communication or a network connection, by the processor of the detective vehicle, messages regarding a status of the target vehicle;
    based on obtaining the messages, determining, by the processor of the detective vehicle, the status of the target vehicle, wherein the status is one of: malicious or innocent; and
    based on determining that the status of the target vehicle, notifying, by the processor of the detective vehicle, the vehicles associated with the identifiers on the list of the determination.

13. The computer program product of claim 12, wherein a vehicle with a malicious status sends erroneous messages the plurality of vehicles, and wherein a vehicle with an innocent status sends correct messages to the plurality of vehicles.

14. The computer program product of claim 12, further comprising:
    based on determining that the status of the target vehicle is innocent, retaining an identifier of the target vehicle on the list; and
    transmitting, by the processor of the detective vehicle, the list to the target vehicle.

15. The computer program product of claim 12, wherein the obtaining the messages comprises obtaining message from at least one of: a group of vehicles from the plurality of vehicles, or an infrastructure-based server accessible to the target vehicle via a network connection, wherein the detective vehicle and each vehicle of the plurality of vehicles has a sporadic connection or no connection to the infrastructure-based server.

16. The computer program product of claim 12, wherein the portion of the plurality of vehicles and the detective vehicle are within the vehicle-to-vehicle communication range comprise the vehicles associated with the identifiers on the list.

17. The computer program product of claim 12, the vehicles associated with the identifiers on the list comprise vehicles in direct communication with the detective vehicle within the vehicle-to-vehicle communication range and in indirect communication with the detective vehicle over at least one hop on a network.

18. The computer program product of claim 17, wherein the network is a self-forming mesh network.

19. The computer program product of claim 14, wherein the target vehicle is outside of the vehicle-to-vehicle communication range and accessible to the detective vehicle over at least one hop.

20. A computer system for detecting a malicious vehicle, the computer system comprising:
    a memory; and
    a processor in communications with the memory, wherein the computer system is configured to perform a method, the method comprising:
        maintaining, by a processor of a detective vehicle, a list comprising identifiers of vehicles determined by the processor of the detective vehicle to have an innocent status;
        selecting, by the processor of a detective vehicle, for each sub-period of a predefined time period, a target vehicle from a plurality of vehicles,
            wherein the detective vehicle communicates either directly or indirectly with each vehicle of the plurality of vehicles and accepts communications from the plurality of vehicles,
            wherein a portion of the plurality of vehicles and the detective vehicle are within a vehicle-to-vehicle communication range, and
            wherein vehicle-to-vehicle communication does not utilize infrastructure network connectivity;
        based on the selecting, obtaining, over a vehicle-to-vehicle communication or a network connection, by the processor of the detective vehicle, messages regarding a status of the target vehicle;
        based on obtaining the messages, determining, by the processor of the detective vehicle, the status of the target vehicle, wherein the status is one of: malicious or innocent; and
        based on determining that the status of the target vehicle, notifying, by the processor of the detective vehicle, the vehicles associated with the identifiers on the list of the determination.

* * * * *